No. 869,498. PATENTED OCT. 29, 1907.
E. G. LATTA.
SHOE TREE AND HOLDER.
APPLICATION FILED MAR. 7, 1904.
2 SHEETS—SHEET 1.
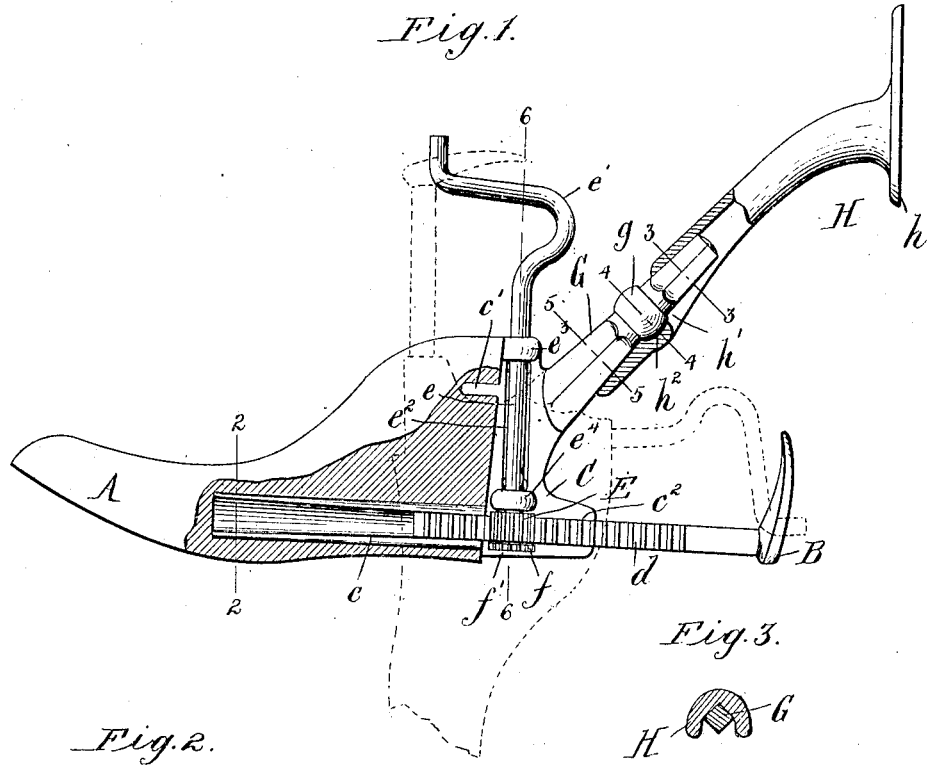
Fig. 1.
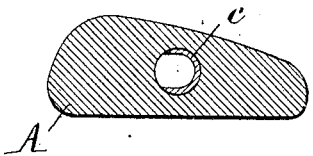
Fig. 2.
Fig. 3.
Fig. 4.
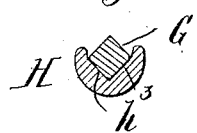
Fig. 5.
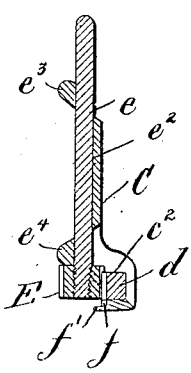
Fig. 6.
Fig. 7.
Witnesses:—
R. W. Renner.
J. L. Langner.
Inventor:
E. G. Latta
by Wilhelm, Parker & Hald
Attorneys No. 869,498. PATENTED OCT. 29, 1907.
E. G. LATTA.
SHOE TREE AND HOLDER.
APPLICATION FILED MAR. 7, 1904.
2 SHEETS—SHEET 2.
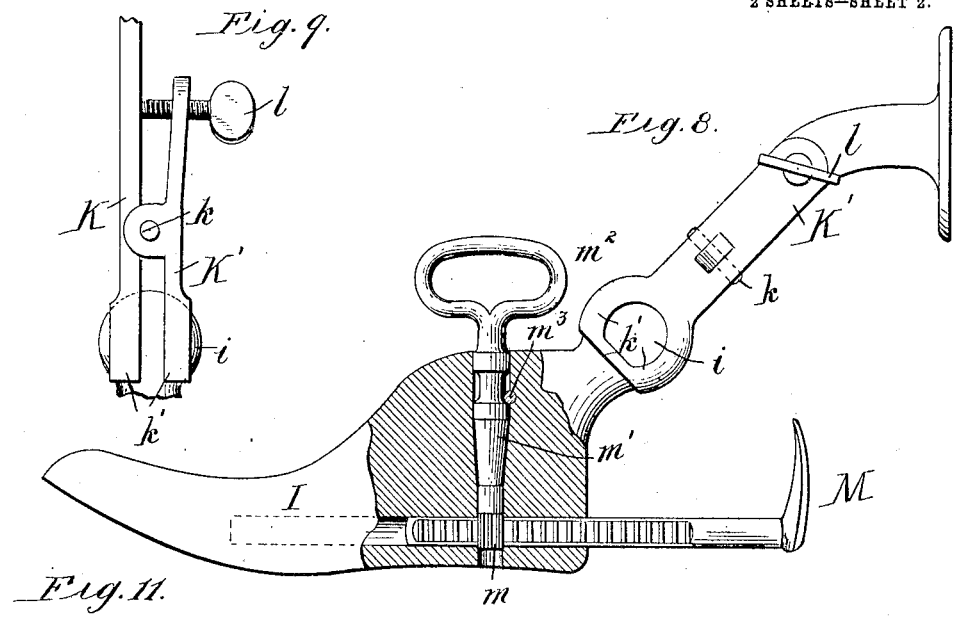
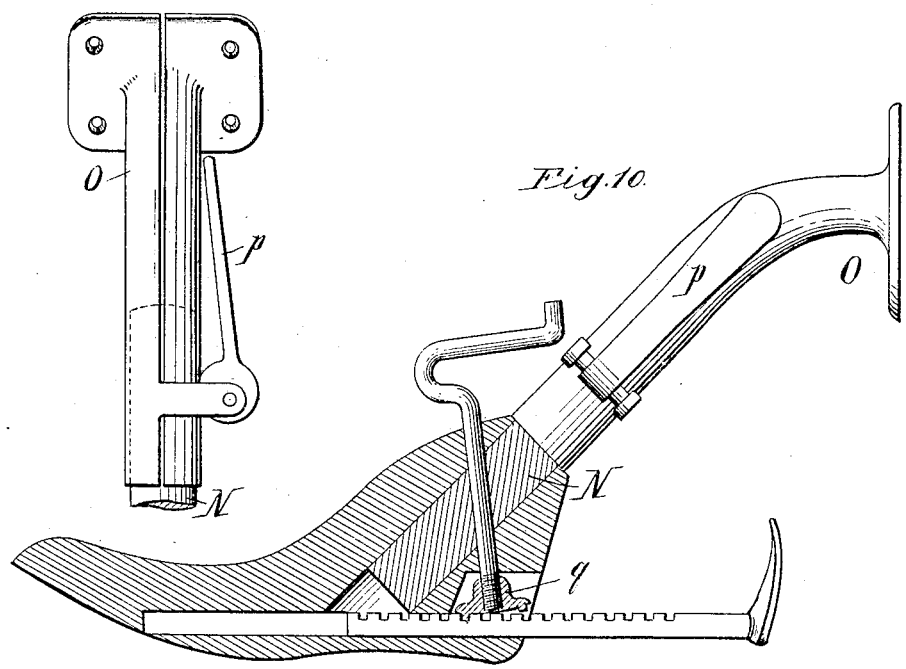
Witnesses:—
Inventor
E. G. Latta
Wilhelm Parker & Hald
Attorneys.

UNITED STATES PATENT OFFICE.

EMMIT G. LATTA, OF FRIENDSHIP, NEW YORK, ASSIGNOR OF ONE-HALF TO HOWARD V. D. WALDRON, OF NEW BRUNSWICK, NEW JERSEY.

SHOE TREE AND HOLDER.

No. 869,498.    Specification of Letters Patent.    Patented Oct. 29, 1907.

Application filed March 7, 1904. Serial No. 196,817.

*To all whom it may concern:*

Be it known that I, EMMIT G. LATTA, a citizen of the United States, residing at Friendship, in the county of Allegany and State of New York, have invented new and useful Improvements in Shoe Trees and Holders, of which the following is a specification.

This invention relates to that kind of combined shoe trees and holders comprising a fixed wall bracket and a tree which is separable from the bracket and adapted to remain in the shoe to preserve its form until wanted for wear and to be attached to the fixed bracket to hold the shoe stationary while cleaning and polishing the same.

The object of the invention is to produce an efficient and desirable combined shoe tree and bracket of simple, compact and inexpensive construction, in which the tree is provided with powerful means for stretching the shoe when desired, and is adapted to be readily secured detachably to the bracket and held in different positions to hold the shoe most favorably for cleaning and polishing its different portions.

In the accompanying drawings consisting of two sheets: Figure 1 is a sectional elevation of a combined shoe tree and holder embodying the invention, showing by full and dotted lines different positions of the tree on the bracket. Fig. 2 is a transverse section of the toe support of the tree in line 2—2, Fig. 1. Figs. 3, 4 and 5 are transverse sections of the bracket and tree shank in line 3—3, 4—4 and 5—5, respectively, Fig. 1. Fig. 6 is a section of the tree operating shaft and its bearing in line 6—6, Fig. 1. Fig. 7 is a fragmentary elevation of the bracket and tree shank showing the latter in position to be engaged with and disengaged from the bracket. Fig. 8 is a sectional elevation of a shoe tree and holder of slightly different construction. Fig. 9 is a front elevation of the bracket and tree shank shown in Fig. 8. Fig. 10 is a sectional elevation of another form of shoe tree and holder. Fig. 11 is a front elevation of the bracket and tree shank shown in Fig. 10.

Like letters of reference refer to like parts in the several figures.

The shoe tree comprises a toe support A and a heel support B movable away from the toe support to stretch the shoe, and movable toward the toe support to facilitate its insertion in and removal from the shoe. The toe support consists preferably of the front or toe portion of a wooden last of the same shape and size as that on which the shoe, in which it is to be used, was made. The heel support B is preferably made of metal and of a shape to properly fit the heel of the shoe, and it may be movably secured to the toe support and operated in various ways.

In the construction shown in Figs. 1–7, a metal frame or casting C is secured to the rear end of the toe support by a hollow open sided forward extension $c$ fitted tightly in a straight longitudinal hole in the toe support, in which it is held from turning by a forwardly projecting spur $c'$ on the frame entering a hole in the rear of the toe support. The hollow extension $c$ and a guide groove or seat $c^2$ formed in the lower portion of the frame in line therewith constitute a guide for the stem $d$ of the heel support. This stem is provided at one side with rack teeth, with which meshes a gear pinion E screwed, or otherwise secured on the lower end of a shaft $e$ which is provided at its upper end with an operating crank or handle $e'$ of any suitable form, and is journaled to rotate in suitable bearings on the frame, formed for instance by an open semicircular seat $e^2$ and perforated bearing lugs $e^3$ $e^4$ above and below the seat. By turning the shaft in one direction the heel support can be moved rearwardly or away from the toe support with great force, if desired, to stretch the shoe, and by a reverse movement of the shaft the heel support is retracted thus enabling the tree to be inserted into and removed from the shoe. The frame C is provided below the rack-bar or stem of the heel support with one or more stationary teeth $f$ with which the gear pinion E can be engaged to hold the pinion from turning and secure the stem and heel support in adjusted positions by simply pressing the shaft E down in its bearings. $f'$ is a lip or projection on the frame below the holding tooth or teeth $f$ to engage the pinion and limit the downward movement thereof. The rack bar or stem of the heel support is made of considerable length so that the metal parts described can be made in one size and applied to toe supports of different sizes to produce trees of sizes to properly fit all ordinary sizes of shoes.

The tree is provided with a shank G which serves as a handle for inserting and removing it from the shoe, and for connection with a bracket to support the shoe when cleaning and polishing it. This shank, in the construction shown in Figs. 1–7, constitutes an integral extension of the metal frame or casting C and preferably projects upwardly and rearwardly therefrom at an angle of about 45°, and is tapering and of angular, or polygonal, cross section and is provided between its ends with a ball or spherical enlargement $g$.

H represents the bracket for holding the tree. It has a base $h$ of any preferred form to be secured to a wall, or other support, by screws, or in any other convenient manner, and an arm preferably extending forwardly and downwardly from the base at an angle of about 45° to provide a clear space beneath it for the rear part of the shoe upper. The bracket arm is provided between its ends with a hole $h'$ and just below the hole with an open substantially hemi-spherical socket $h^2$ to receive the ball of the tree shank, see Figs.

1 and 4. Below the socket the arm is of substantially U-shape in cross section having flat faces $h^3$ to fit the underside of the angular tree shank, as shown in Fig. 5, while above its hole, it is of substantially inverted U-cross section, having flat faces to fit the upper side of the angular end of the tree shank, see Fig. 3. To connect the tree with the bracket, the tree (with the shoe thereon or not) is tilted up until the shank assumes the position shown in Fig. 7, when the end of the shank can be passed through the hole in the bracket arm until the ball rests in its socket, after which the tree can be dropped or turned down into the position shown in Fig. 1, in which position it will be held by gravity and retained with perfect security by the force applied by the cloth in polishing the shoe. The tree is readily detached from the bracket by lifting it and pulling the shank out of the hole in the bracket.

To polish the rear or heel portion of the shoe the tree with the shoe is raised until its shank is nearly horizontal to disengage the angular interlocking parts, and turned half way around and again dropped into locking position, when the heel will be held uppermost, as shown by broken lines in Fig. 1, in a most favorable position for polishing. In this position the toe of the shoe points downward and is out of the way, and the friction cloth can be used on the heel with an up and down reciprocating movement the same as used on the toe part. This is a much more effective movement than that which has to be used to polish the heel when held to the rear as in the case of the usual holder. Moreover it permits the operator to see his work, which he cannot do when polishing the heel on ordinary holders.

The ball of the tree shank simply acts as a stop to prevent the shank from slipping out of its seat in the bracket arm and acts as a pivot when reversing the shank in the bracket. The shank and bracket form in effect a pivotal connection for the tree whose axis is at an angle of about 45°, and a pivot that may be locked so as to locate either the heel or toe in the most favorable position for polishing. It also permits either edge of the shoe sole to be adjusted uppermost for the application of edge blacking. Another advantage of this reversible feature is that room does not have to be provided between the heel and wall to get at the heel for polishing, thus enabling the bracket extension to be made shorter than that of an ordinary holder, and this tends to hold the shoe with greater rigidity, as well as to permit it to be used in smaller space.

A pair of shoe trees having toe supports or lasts made right and left to fit the right and left shoes is preferably sold with one bracket with which the trees can be interchangeably connected. The device is much more satisfactory when two trees are employed, for the trees can be left in a pair of shoes to preserve their shape, and as the toe support of each tree fits its shoe perfectly and supports every part thereof the shoe takes a better polish than it would if polished on a straight last or support. The device is also a great improvement over the ordinary holder which is provided with only one shoe support which, while it may be detachable from the wall and left in one shoe, leaves the other shoe unprovided for, and furthermore the straight support, if used as a tree or form for the shoe, will spoil its shape in a short while. In fact it hurts the shoe in the short time necessary for polishing it. The holder having the interchangeable trees with the single bracket is less expensive, lighter and less bulky than two complete holders made right and left would be, and it has every advantage of two such holders.

A combined shoe tree and holder may be constructed in various other ways and embody more or less satisfactorily the advantageous features of the tree and holder above described. For instance, Figs. 8–11, disclose different constructions within the scope of this invention.

Figs. 8 and 9 illustrate a less expensive tree and holder, in which the rear end of the wooden last or toe support I is provided with a shank or handle ending in a spherical head or ball $i$, and the bracket is made in two parts K K' pivoted together at $k$ and having at their front ends socket sections $k'$ for the ball of the tree shank. One part of the bracket is secured to the wall or other support and the other is provided at its upper end with a thumb screw $l$ which bears against the fixed part so that by turning the thumb screw the two parts of the socket are caused to firmly clamp and hold the ball. The tree can be turned and secured at any angle which is most desirable in operating on the shoe. In this form of the device the shank of the heel support M is of D section, having rack teeth on its flat side, and slidably engages in a round hole in the wooden toe support. The pinion $m$ for operating the rack is formed integrally with the lower end of a tapering shaft $m'$, bearing in a correspondingly shaped hole in the wooden last and having a suitable handle $m^2$ for turning it. By wedging the shaft down in its bearing it and the pinion are locked to hold the heel support in adjusted positions. $m^3$ is a pin inserted in the last and engaging in a circumferential groove in the shaft to prevent the displacement of the latter.

Figs. 10 and 11 show still another construction in which the shank and handle is formed by a wooden pin N permanently seated in a hole in the rear end of the toe support or last, and is adapted to enter a socket in a two-part, or split, bracket O, in which it is securely clamped in any desired position by closing the socket about the pin by a cam lever $p$ pivoted to ears on one part of the bracket and bearing against the other part. The heel support in this form of the device is operated by a special gear wheel $q$ secured to an operating shaft and having a spiral or scroll cam which engages the teeth of the rack bar or stem of the heel support. This gear wheel holds the rack bar in whatever position it is moved to and requires no locking means.

I claim as my invention:—

1. The combination of a wall bracket having a downwardly and forwardly projecting arm, and a shoe tree having a projecting attaching shank constructed for detachable and adjustable connection with said bracket arm, substantially as set forth.

2. The combination of a wall bracket having a fixed arm extending downwardly and forwardly, and a shoe tree detachably connected to said arm at a point located within the ankle portion of a shoe supported by the tree, substantially as set forth.

3. The combination of a wall bracket having an integral projecting arm, a shoe tree comprising a wooden toe portion and a movable heel portion, and a part which is fixed to said toe portion and supports the heel portion of the tree, and is constructed for attachment to said bracket arm, substantially as set forth.

4. The combination of the toe part of a shoe tree, a metal piece fixed to said toe part and having an upwardly and rearwardly projecting shank for detachable connection with a supporting bracket and a forward hollow extension which enters said toe part and forms a rearwardly opening guide, a heel part having a support which slides in said guide, and means mounted on said metal piece in front of said heel part for moving the latter, substantially as set forth.

Witness my hand this 2nd day of March, 1904.

EMMIT G. LATTA.

Witnesses:
M. W. POTTER,
H. L. BLOSSOM.